United States Patent
Dods

(10) Patent No.: US 10,382,468 B2
(45) Date of Patent: Aug. 13, 2019

(54) MALWARE IDENTIFICATION VIA SECONDARY FILE ANALYSIS

(71) Applicant: Juniper Networks, Inc., Sunnyvale, CA (US)

(72) Inventor: Craig Dods, Stittsville (CA)

(73) Assignee: Juniper Networks, Inc., Sunnyvale, CA (US)

( * ) Notice: Subject to any disclaimer, the term of this patent is extended or adjusted under 35 U.S.C. 154(b) by 130 days.

(21) Appl. No.: 15/640,622

(22) Filed: Jul. 3, 2017

(65) Prior Publication Data

US 2019/0007436 A1 Jan. 3, 2019

(51) Int. Cl.
| | |
|---|---|
| *H04L 29/06* | (2006.01) |
| *G06F 21/53* | (2013.01) |
| *G06F 21/55* | (2013.01) |
| *G06F 21/56* | (2013.01) |

(52) U.S. Cl.
CPC ......... *H04L 63/1425* (2013.01); *G06F 21/53* (2013.01); *G06F 21/554* (2013.01); *G06F 21/566* (2013.01); *H04L 63/145* (2013.01); *H04L 63/1491* (2013.01)

(58) Field of Classification Search
CPC .............. H04L 63/1425; H04L 63/145; H04L 63/1491; G06F 21/53; G06F 21/554; G06F 21/566; G06F 2009/45587; G06F 21/568; G06F 2221/2149
See application file for complete search history.

(56) References Cited

U.S. PATENT DOCUMENTS

| | | |
|---|---|---|
| 5,398,196 A | 3/1995 | Chambers et al. |
| 2011/0271343 A1* | 11/2011 | Kim .................. G06F 21/566 726/23 |
| 2016/0156658 A1 | 6/2016 | Thomas et al. |
| 2016/0292420 A1* | 10/2016 | Langton ............. G06F 21/566 |
| 2016/0342787 A1 | 11/2016 | Wang et al. |
| 2017/0235951 A1* | 8/2017 | Harrison ............. G06F 21/51 726/24 |
| 2017/0262632 A1* | 9/2017 | Jaman ................ G06F 21/566 |
| 2018/0225447 A1* | 8/2018 | Pintiysky ............ G06F 21/53 |
| 2018/0336351 A1* | 11/2018 | Jeffries .............. G06F 21/566 |
| 2019/0007426 A1* | 1/2019 | Bergstrom ........ H04L 63/1416 |

OTHER PUBLICATIONS

Extended European Search Report for Application No. EP18175388.0, dated Nov. 21, 2018, 7 pages.

* cited by examiner

*Primary Examiner* — Techane Gergiso
(74) *Attorney, Agent, or Firm* — Harrity & Harrity, LLP

(57) ABSTRACT

A device may include one or more processors to receive a file that may be analyzed for malware; open the received file in a secure environment; determine that a secondary file in the secure environment may have been accessed based on the received file being opened; analyze the secondary file in the secure environment to identify malware; and/or perform an action associated with the received file based on the secondary file being analyzed.

20 Claims, 6 Drawing Sheets

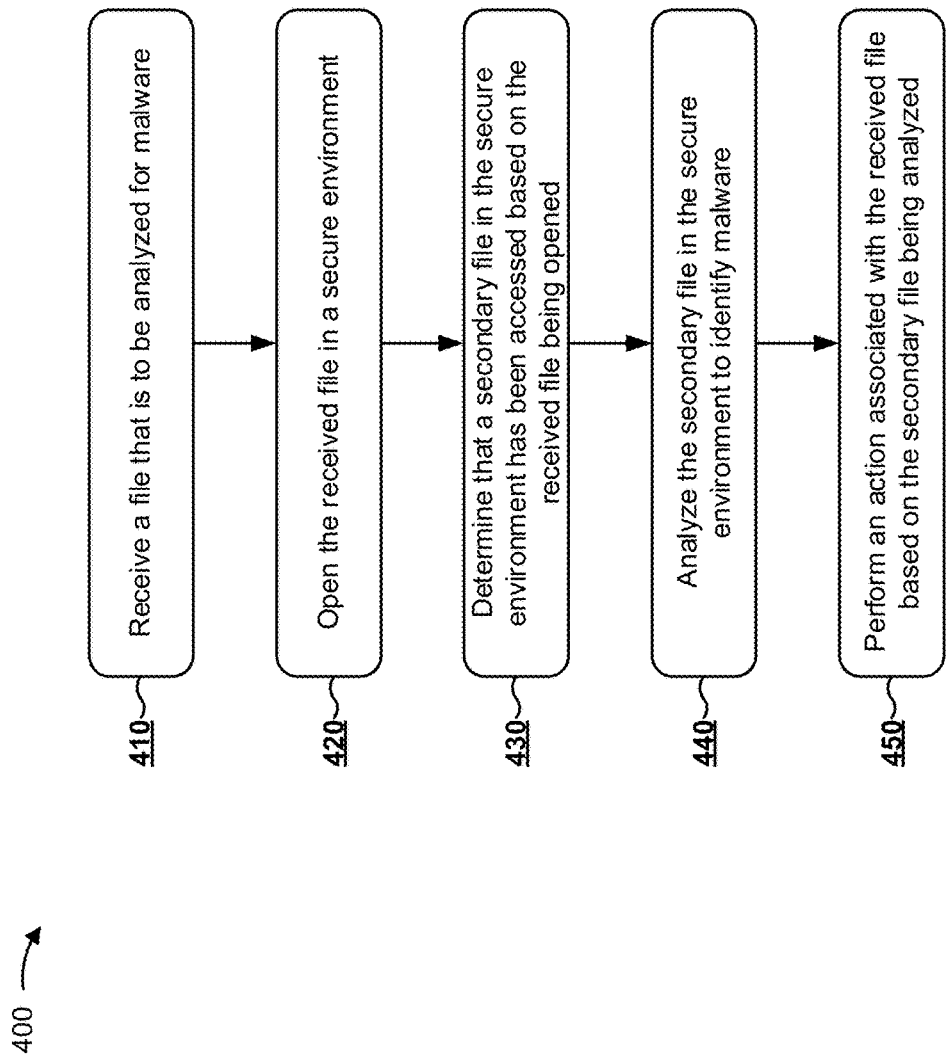

MALWARE IDENTIFICATION VIA SECONDARY FILE ANALYSIS

BACKGROUND

Malware (i.e., malicious software) may refer to any software used to disrupt the operations of a computer or mobile device. This may include gathering sensitive information, gaining access to private computer systems, encrypting files, and/or displaying unwanted advertising. Malware may include viruses, worms, Trojan horses, adware, spyware, ransomware, keyboard loggers, phishing, and/or the like.

SUMMARY

According to some possible implementations, a device may include one or more processors to receive a file that may be analyzed for malware; open the received file in a secure environment; determine that a secondary file in the secure environment may have been accessed based on the received file being opened; analyze the secondary file in the secure environment to identify malware; and/or perform an action associated with the received file based on the secondary file being analyzed.

According to some possible implementations, a non-transitory computer-readable medium may store instructions, the instructions comprising one or more instructions that, when executed by one or more processors of a network administration device, cause the one or more processors to receive a file that may be analyzed for malware; open the received file in a first secure environment; determine that a secondary file in the secure environment may have been accessed after opening the received file; open the secondary file in a second secure environment to identify malware; and/or perform an action associated with the received file based on identifying the malware.

According to some possible implementations, a method may include receiving, by one or more devices of a security platform, a file that may be analyzed for malware; opening, by at least one of the one or more devices, the received file in a secure environment; determining, by at least one of the one or more devices, that a secondary file in the secure environment may have been modified based on the received file being opened; opening, by at least one of the one or more devices, the secondary file in the secure environment; identifying, by at least one of the one or more devices, malware after opening the secondary file; and/or performing, by at least one of the one or more devices, an action associated with the received file based on identifying the malware.

BRIEF DESCRIPTION OF THE DRAWINGS

FIG. 4 is a flow chart of an example process for malware detection via secondary file analysis.

DETAILED DESCRIPTION

Figure 1A:
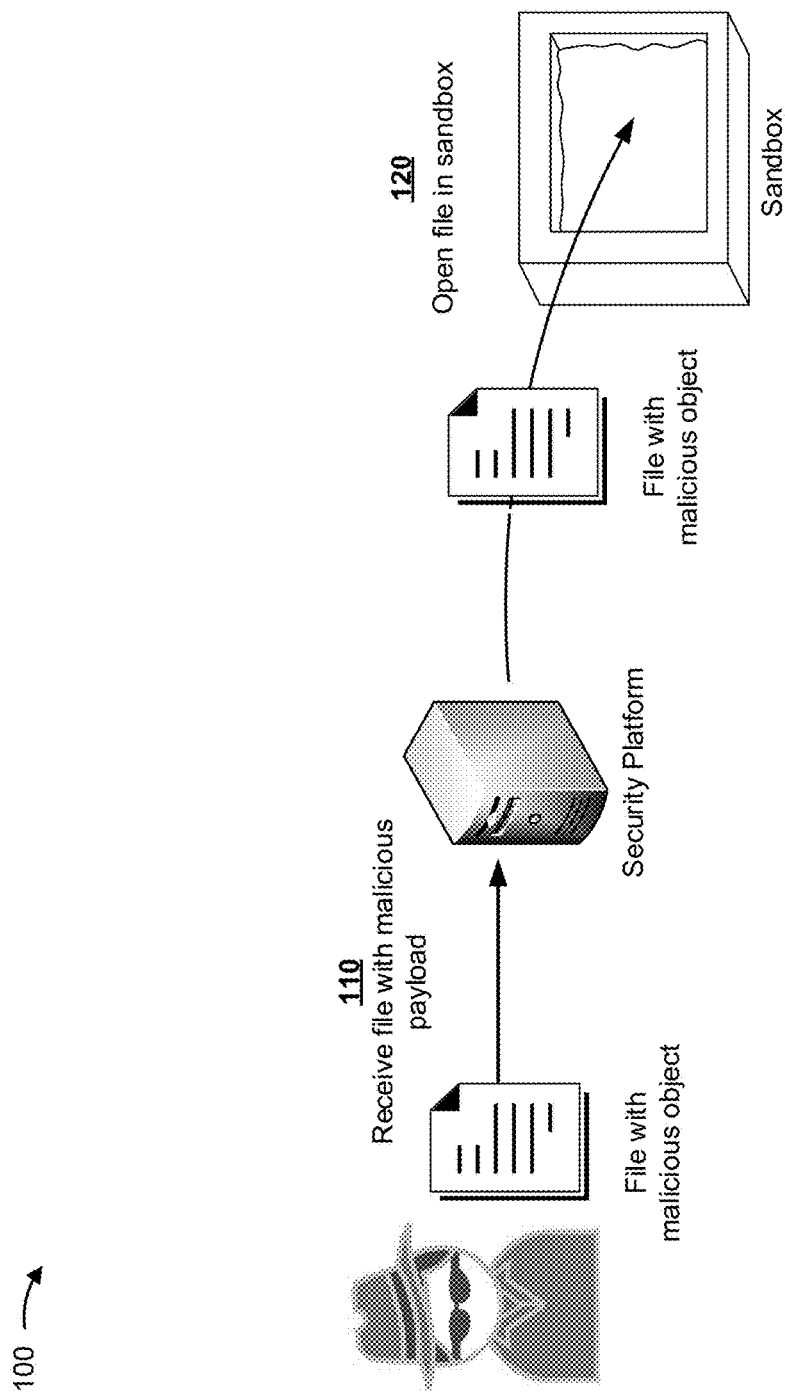
FIGS. 1A-1C are diagrams of an overview of an example implementation described herein.

The following detailed description of example implementations refers to the accompanying drawings. The same reference numbers in different drawings may identify the same or similar elements.

Malware may be detrimental to any computing environment in which the malware is released. In some instances, malware may be released through activation of a malicious payload embedded or hidden within a file (e.g., a text file, an application document, an email attachment, etc.). Typically, a security platform may identify the malicious payload within the file using a secure environment (e.g., a sandbox). The security platform may analyze the file, detect the malicious payload (e.g., using static analysis, dynamic analysis, etc.), and block the file from reaching its intended target(s) or destination(s) (e.g., by quarantining the file, blocking the file, dropping the file, or the like).

In some instances, a malicious object within a file may be masked to appear as a feature of the file. Such a malicious object may be capable of embedding malicious payloads into another file or files of a system (referred to herein as secondary file(s)). For example, the malicious object may embed the malicious payload in a similar manner as the feature of the file would perform a task (e.g., a malicious object may appear as a macro of an application). Accordingly, when a security platform analyzes a file with such a malicious object in a secure environment, the security platform may presume that the malicious object is an allowable feature of the file because the malicious object is not recognized as a malicious payload, but a feature of the file. As such, the file may reach its intended target system or destination system (e.g., a client device, an email server, etc.) as the file is able to bypass the secure environment.

When a user opens the file, the malicious object may embed the malicious payload into a set of secondary files without the knowledge of the user. The malicious payload may lie dormant in the set of secondary files until the user opens a secondary file in the set of secondary files. When the user opens the secondary file, the malicious payload may spread malware throughout the system.

Some implementations described herein provide a security platform that utilizes a secure environment (e.g., a sandbox) with a file directory to analyze files for malicious objects that embed malicious payloads in secondary files as described above. In some implementations, the security platform monitors secondary files or a file directory of secondary files within the secure environment to determine whether the secondary files are accessed (e.g., opened, modified, etc.) based on opening a received file. By detecting that the secondary files have been accessed (because the malicious object embedded the malicious payload within the secondary files), the security platform may analyze the accessed secondary files to determine whether the accessed secondary files include a malicious payload. For example, the security platform may execute the accessed secondary files to determine whether a malicious payload was embedded within the accessed secondary files. When malicious payloads are detected, the security platform may perform an action on the received file (e.g., block the file from reaching an intended target system or destination system, quarantine the file, further analyze the file, etc.).

Accordingly, some implementations described herein may prevent malware from harming targeted systems, and thus prevent system failures, shutdowns, inoperability, security breaches, loss of files or information (e.g., personal or financial information), theft, or the like. Therefore, some implementations herein may ensure the health of a system by preventing a malware attack, thus, conserving resources, time, and costs of handling an attacked system and/or recovering the system from the potential malware attack.

Figure 1B:
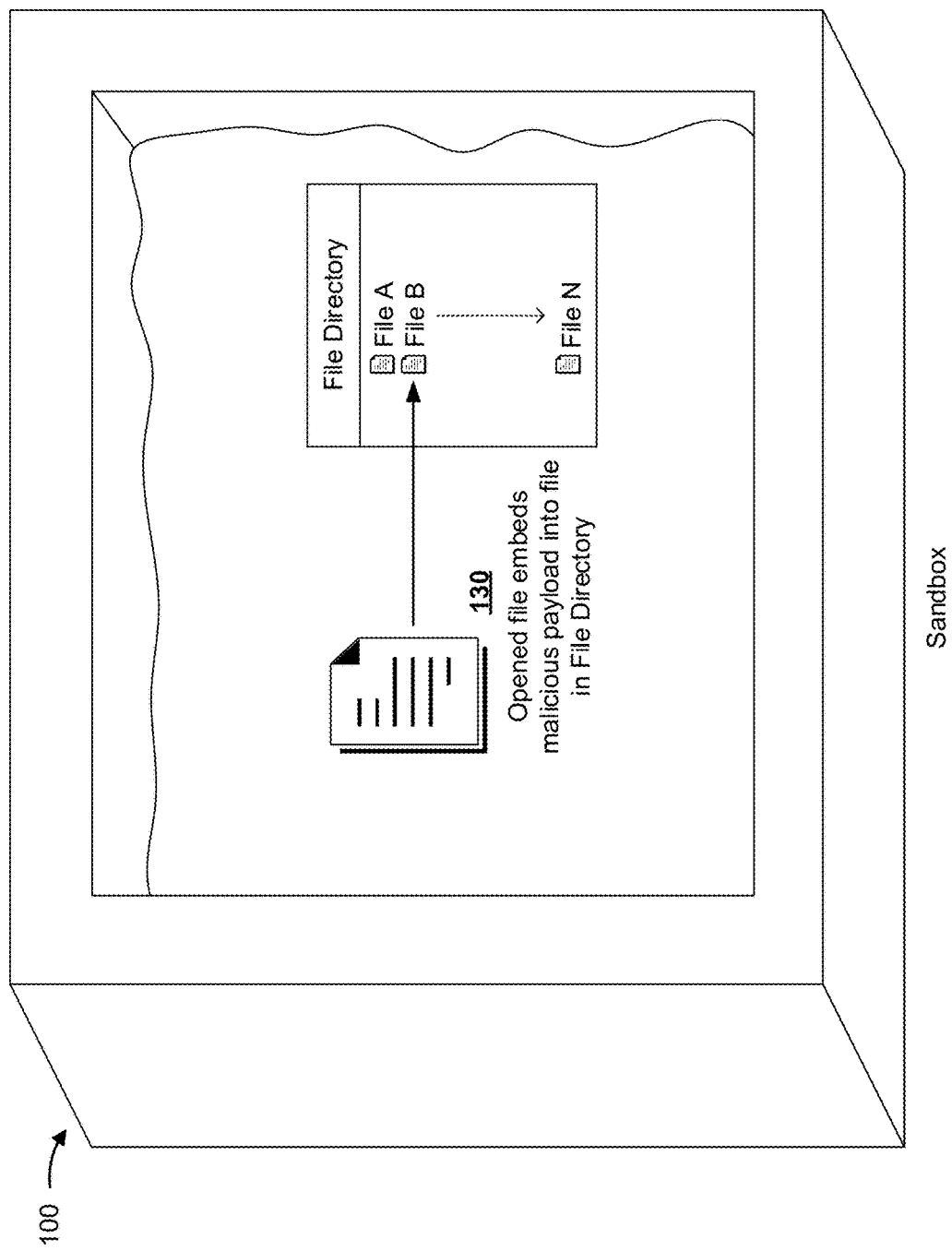
Figure 1C:
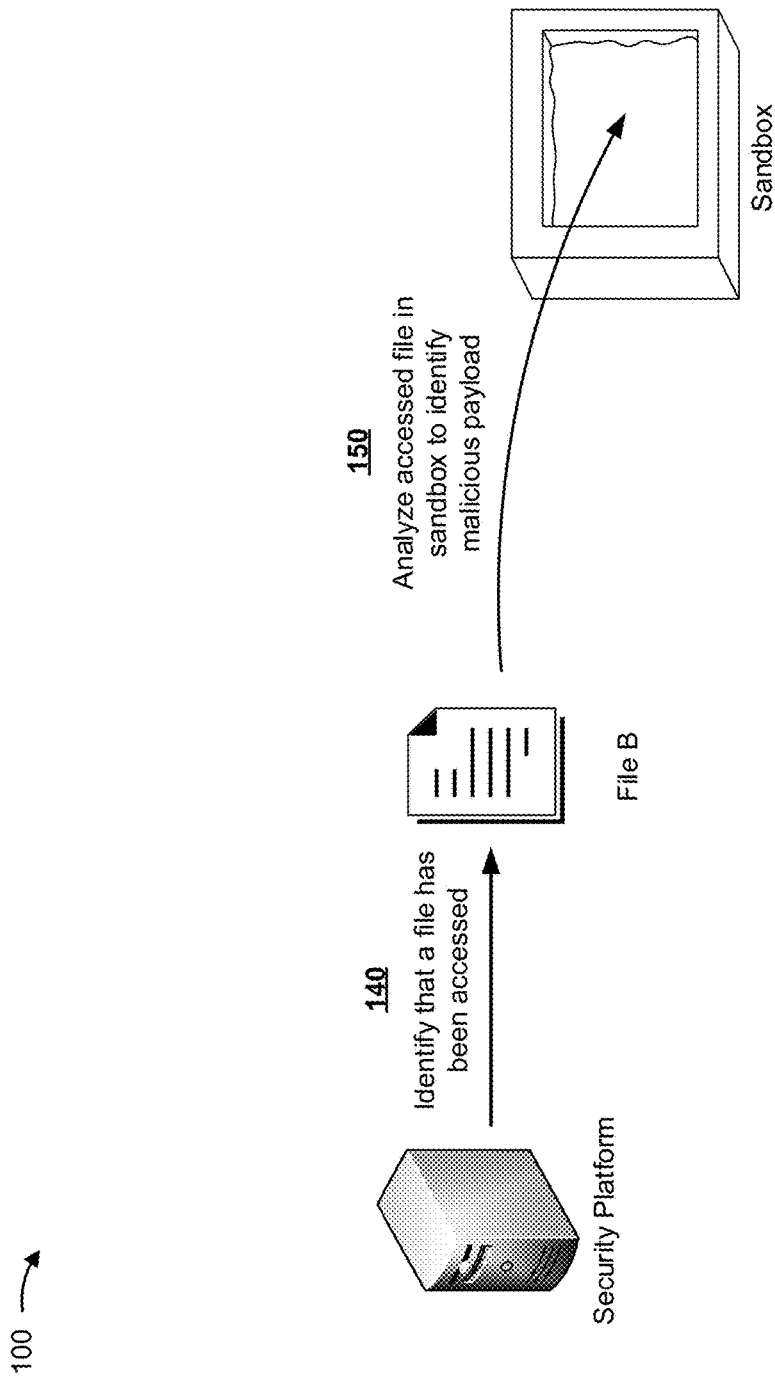

FIGS. 1A-1C are diagrams of an overview of an example implementation 100 described herein. Generally, in example implementation 100, a malicious file is received and opened, causing a malicious object of the opened malicious file to embed a malicious payload in a secondary file. In example implementation 100, the secondary file may then be analyzed to detect the malicious payload and/or detect that the malicious file included a malicious payload.

As shown in FIG. 1A, and by reference number 110, a security platform receives a file with a malicious object (which may be referred to herein as a "malicious file"). The malicious file may be received from a malicious entity, such as a malicious client device, a malicious server, a malicious network device, a client device, server, or network device that has been taken over by the malicious entity, etc. As shown by reference number 120, the security platform may open the malicious file in secure environment, such as a sandbox. The sandbox of FIGS. 1A-1C is a secure environment in which the security platform may analyze, test, and/or monitor the malicious file. The sandbox may simulate an operable non-secure computing environment such that the malicious file behaves in a similar manner as if the malicious file were in the non-secure computing environment.

As shown in FIG. 1B, and by reference number 130, after the security platform opens the malicious file, the malicious file embeds a malicious payload into a secondary file, File B, in a directory of the sandbox. In some implementations, the directory of the sandbox, which includes Files A-N, may serve as a decoy or "honeypot" to attract files, such as the malicious file, to embed malicious payloads into secondary files of the sandbox if the files include malicious objects. Accordingly, Files A-N may be installed or planted as secondary files in the sandbox to cause a malicious object of the malicious file to embed a malicious payload in the secondary file.

As shown in FIG. 1C, and by reference number 140, the security platform may identify that a file (in this case, File B) in the directory has been accessed. For example, the security platform may detect that a file in the directory was opened and closed, that a file in the directory was modified, that a timestamp associated with accesses to files in the directory indicated that a file was accessed after opening the malicious file, or the like. The security platform, as shown by reference number 150, may then analyze the accessed file (i.e., File B) in the sandbox (or another sandbox) to identify the malicious payload embedded in the file. Accordingly, the example implementation 100 enables detection of malicious objects that embed malicious payloads in secondary files of computing environments.

As described above, in the example implementation 100 of FIGS. 1A-1C, a secondary file infected with a malicious payload by a received file may be analyzed to detect or identify malware (e.g., a malicious object) in the received file. Accordingly, the example implementation 100 may prevent files with malicious objects that infect secondary files from bypassing the security platform and reaching intended target systems to spread malware. As such, resources, time, and costs may be saved by preventing the malicious objects from harming (e.g., shutting down, slowing, extracting information, crashing, encrypting files, etc.) computing environments and mitigating resources, time, and costs to recover from such harm.

As indicated above, FIGS. 1A-1C are provided merely as an example. Other examples are possible and may differ from what was described with regard to FIGS. 1A-1C.

Figure 2:
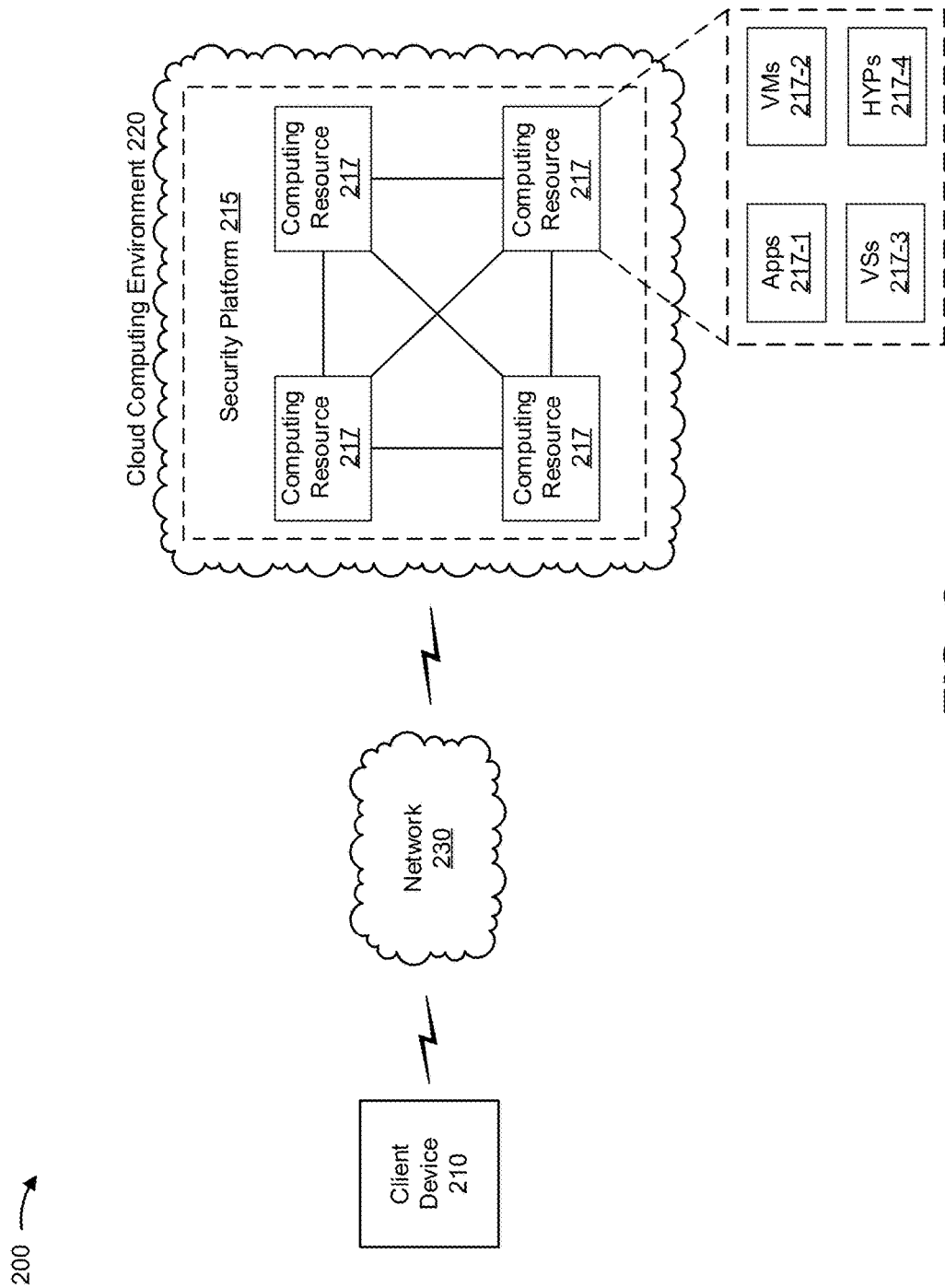
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a security platform 215 hosted within a cloud computing environment 220, and a network 230. Devices of environment 200 may interconnect via wired connections, wireless connections, or a combination of wired and wireless connections.

Client device 210 includes one or more devices capable of receiving, generating, storing, processing, and/or providing information associated with malware, such as a malicious file including a malicious object and/or a malicious payload. For example, client device 210 may include a user device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a server device, a network device (e.g., a router, a gateway, a switch, etc.), or a similar type of device. In some situations, client device 210 may represent a device owned by a malicious entity or a device overtaken by a malicious entity. In this case, client device 210 may take the form of a user device, a server device, or a network device. In some situations, client device 210 may represent a device (or collection of devices) to which malware is targeted. In this case, client device 210 may take the form of a user device, a collection of user devices, a server device, a collection of server devices (e.g., a collection of web server devices, a collection of email server devices, etc.), a network device, or a collection of network devices.

Security platform 215 includes one or more devices capable of receiving or intercepting files associated with or received from the client device 210. In some implementations, security platform 215 may be capable of determining whether a file received from client device 210 includes malware, such as a malicious object and/or a malicious payload. In some implementations, security platform 215 may be capable of determining whether a malicious file includes a malicious object capable of embedding a malicious payload into secondary files of a computing environment. For example, security platform 215 may perform static analysis, dynamic analysis, or the like on received files to test the files for malware. In some implementations, security platform 215 may include or implement one more secure environments (e.g., sandboxes) to analyze or test received files for malware. Security platform 215, in some implementations, may include, may be included within, or may be implemented by a firewall, an intrusion prevention system (IPS), an intrusion detection system (IDS), or the like.

Security platform 215 may include a server device or a group of server devices. In some implementations, security platform 215 may be hosted in cloud computing environment 220. Notably, while implementations described herein describe security platform 215 as being hosted in cloud computing environment 220, in some implementations, security platform 215 may not be cloud-based or may be partially cloud based.

Cloud computing environment 220 includes an environment that delivers computing as a service, whereby shared resources, services, or the like may be provided to analyze received files and identify malware in the received files. Cloud computing environment 220 may provide computation, software, data access, storage, and/or other services that do not require end-user knowledge of a physical location and configuration of a system and/or a device that delivers the services. As shown, cloud computing environment 220 may include a security platform 215 and/or computing resources 217 (which may be referred to herein individually as computing resource 217).

Computing resource 217 includes one or more personal computers, workstation computers, server devices, or another type of computation and/or communication device. In some implementations, computing resource(s) 217 may host security platform 215. The cloud resources may include compute instances executing in computing resource 217, storage devices provided in computing resource 217, data transfer devices provided by computing resource 217, or the like. In some implementations, computing resource 217 may communicate with other computing resources 217 via wired connections, wireless connections, or a combination of wired and wireless connections. In some implementations, computing resource may execute a secure environment (e.g., a sandbox) on behalf of security platform 215.

As further shown in FIG. 2, computing resource 217 may include a group of cloud resources, such as one or more applications ("APPs") 217-1, one or more virtual machines ("VMs") 217-2, virtualized storage ("VSs") 217-3, one or more hypervisors ("HYPs") 217-4, or the like.

Application 217-1 includes one or more software applications that may analyze files and/or that may be executed within a secure environment to test files. For example, application 217-1 may include software associated with security platform 215 and/or any other software capable of being provided via computing resource 217. In some implementations, one application 217-1 may send/receive information to/from one or more other applications 217-1, via virtual machine 217-2.

Virtual machine 217-2 includes a software implementation of a machine (e.g., a computer) that executes programs like a physical machine. Virtual machine 217-2 may be either a system virtual machine or a process virtual machine, depending upon use and degree of correspondence to any real machine by virtual machine 217-2. A system virtual machine may provide a complete system platform that supports execution of a complete operating system ("OS"). A process virtual machine may execute a single program, and may support a single process. In some implementations, virtual machine 217-2 may execute on behalf of security platform 215 to implement a secure environment (e.g., a sandbox). In some implementations, one virtual machine 217-2 may cause one or more other virtual machines 217-2 to perform a function.

Virtualized storage 217-3 includes one or more storage systems and/or one or more devices that use virtualization techniques within the storage systems or devices of computing resource 217. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. In some implementations, directories including secondary files that may be accessed by malicious objects in malicious files may be stored in virtualized storage 217-3.

Hypervisor 217-4 provides hardware virtualization techniques that allow multiple operating systems (e.g., "guest operating systems") to execute concurrently on a host computer, such as computing resource 217. Hypervisor 217-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
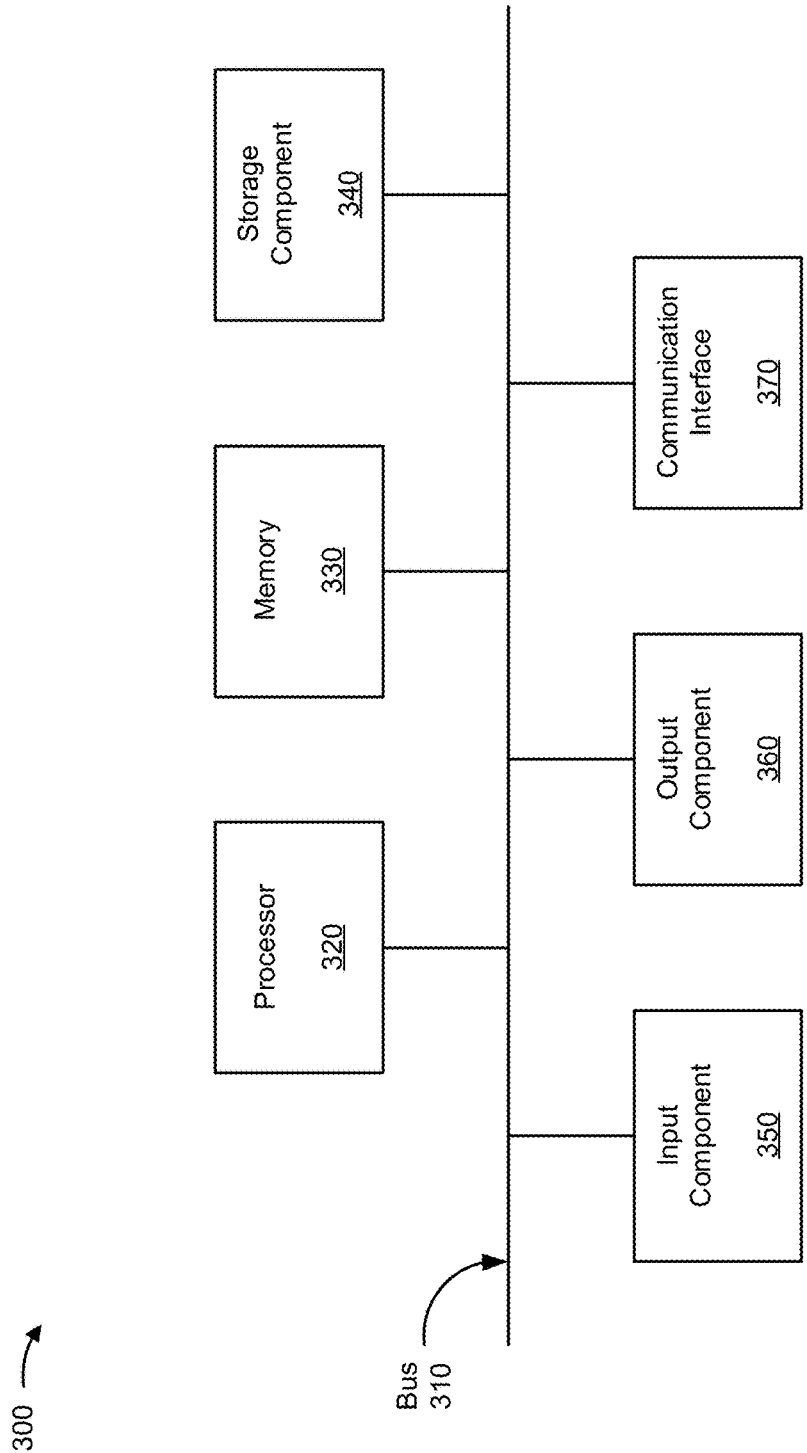
FIG. 3 is a diagram of example components of one or more devices of FIG. 2.

FIG. 3 is a diagram of example components of a device 300. Device 300 may correspond to client device 210, security platform 215, and/or cloud computing environment 220. In some implementations, client device 210, security platform 215, and/or cloud computing environment 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for malware detection via secondary file analysis. In some implementations, one or more process blocks of FIG. 4 may be performed by security platform 215. In some implementations, one or more process blocks of FIG. 4 may be performed by another device or a group of devices separate from or including security platform 215, such as client device 210 and cloud computing environment 220.

As shown in FIG. 4, process 400 may include receiving a file that is to be analyzed for malware (block 410). For example, security platform 215 may receive the file that is to be analyzed for malware. In some implementations, security platform 215 may receive the file from client device 210 through network 230. In some implementations, security platform 215 may receive the file because the file is intended for client device 210 and security platform 215 is positioned to protect client device 210, a set of client devices 210, a network associated with client device 210, or the like.

In the description to follow, client device 210 will be treated as providing the file, not as a destination of the file.

In some implementations, security platform 215 may receive the file by intercepting the file from client device 210 before the file reaches a target computing environment (e.g., an intended recipient of the file). Accordingly, security platform 215 may prevent the file from reaching the target computing environment until it is determined that the file is safe for the target computing environment (i.e., does not include malicious objects or malicious payloads). As used herein, a file may be considered safe when it is determined that the file does not include malware, such as a malicious object or malicious payload capable of spreading the malware throughout a computing environment.

A file is any object that stores data for a program or application of a computing environment. For example, the file may be a document file, a spreadsheet file, a presentation slide or presentation slide deck file, an email, an email attachment, a portable document format (PDF) file, an image file, a video file, an audio file, or the like. In some implementations, the file may include a malicious object or malicious payload that seeks to spread malware to a computing environment (e.g., a server, an email server, a network device, a client device, etc.). A malicious object is an object that is capable of embedding a malicious payload into one or more secondary files of a computing environment, including within a secure environment or sandbox. A malicious payload is an object that, when triggered in a computing environment, may spread malware throughout the computing environment. A malicious payload may be triggered when a file containing the malicious payload is opened (e.g., accessed, activated, initiated, installed, executed, etc.).

In this way, the security platform 215 may receive a file to enable the security platform 215 to analyze the file in a secure environment.

As further shown in FIG. 4, process 400 may include opening the received file in a secure environment (block 420). For example, security platform 215 may execute the file in the secure environment. In some implementations, the security platform 215 may execute the file in the secure environment based on receiving the file.

Security platform 215 may execute the file by opening the file within a secure environment implemented using one or more computing resources 217 (e.g., the file may be executed or opened via application 217-1, virtual machine 217-2, and/or hypervisor 217-4). In some implementations, security platform 215 may execute the file by opening the file with an application (e.g., application 217-1) associated with the file. For example, security platform 215 may open a document file with a document application, a spreadsheet file with a spreadsheet application, an image file with an image application, a PDF file with a PDF application, and so on. Such applications may be implemented by applications 217-1 in computing resource 217.

A secure environment (which may be referred to herein as a "sandbox") refers to a computing mechanism for testing or analyzing files for malicious objects or malicious payloads. The secure environment may isolate untested files and testing of the files from devices (e.g., client devices, servers, network devices, etc.) of a computing environment under operation and/or from one or more computing resources 217 of security platform 215. In some implementations, the secure environment is capable of analyzing or opening files to identify malware without risking harm to a host of the secure environment (e.g., the security platform 215) or targets that may be communicatively coupled with the host of the secure environment (e.g., a target device of the malware). A secure environment may be implemented within or by security platform 215. For example, the secure environment may be hosted by one or more computing resources 217 within the security platform 215.

In this way, security platform 215 may open the file in the secure environment to determine if the file or an object of the file (e.g., a malicious object) accesses a secondary file of the secure environment.

As further shown in FIG. 4, process 400 may include determining that a secondary file in the secure environment has been accessed based on the received file being opened (block 430). For example, security platform 215 may determine that a secondary file in the secure environment has been accessed (which indicates that a malicious payload may have been embedded in the secondary file as a result of opening the received file). In some implementations, security platform 215 may monitor the secondary file or other secondary files in a directory of the secure environment after opening the received file in the secure environment.

A secondary file is a file within a computing environment (e.g., the secure environment) in which a file has been opened. For example, a secondary file may be a file within a directory of a computing environment that runs an application or program that opens another file, such as the received and opened file of blocks 410 and 420. In some implementations, security platform 215 may plant or install a secondary file in the secure environment to cause a malicious object of a received file to embed a malicious payload in the secondary file. Accordingly, in some implementations, the secondary file may be within a directory of a secure environment that opens a file to determine if the file includes a malicious object or a malicious payload.

In some implementations, security platform 215 may determine that the secondary file has been accessed based on the secondary file being opened or modified. In some implementations, security platform 215 may monitor a directory of secondary files in the secure environment after opening the file to detect that the secondary file has been accessed. For example, security platform 215 may monitor a timestamp, associated with the secondary file, that indicates when the secondary file was last accessed (e.g., opened or modified). Additionally, or alternatively, security platform 215 may monitor applications (e.g., applications 217-1) or other instruments that may be used to access (e.g., open or modify) the secondary file. In some implementations, security platform 215 may compare a version of the secondary file saved prior to opening the received file with a version of the secondary file saved after opening the received file to detect any modifications or changes to the secondary file (which might be caused by the addition of a malicious payload).

In some implementations, security platform 215 may monitor a designated set of secondary files in a directory of the secure environment. The designated set of secondary files may be monitored based on being associated with a same application as the received file, based on being one of the most recent files opened within the secure environment, based on being opened within a particular time period (e.g., a most recent time period) relative to when the received file was opened, or the like.

In this way, security platform 215 may determine that a secondary file has been accessed based on the file being accessed indicating that the secondary file is to be analyzed for a malicious payload.

As further shown in FIG. 4, process 400 may include analyzing the secondary file in the secure environment to identify malware (block 440). For example, security platform 215 may analyze the secondary file in the secure environment. In some implementations, security platform 215 may analyze the secondary file in the secure environment based on determining that the secondary file was accessed.

In some implementations, security platform 215 may analyze the secondary file in a same secure environment in which the received file was opened. Additionally, or alternatively, security platform 215 may analyze the secondary file in a secure environment separate from the secure environment in which the received file was opened. For example, security platform 215 may copy the secondary file and instruct a separate computing resource 217, a separate virtual machine 217-2, or a separate hypervisor 217-4 to implement the separate secure environment.

In some implementations, security platform 215 may conduct a static analysis (analyzing the secondary file without opening the secondary file), a signature-based analysis (comparing signature sequences of the secondary file with signature sequences in a database of malware signatures), a statistical-based analysis (using machine learning to determine whether the secondary file includes malware), a dynamic analysis (involving opening the secondary file), a behavior-based analysis (analyzing results of opening the secondary file), or the like on the secondary file to identify the malware.

In some implementations, security platform 215 may conduct a static analysis of the secondary file. For example, security platform 215 may analyze the data of the secondary file (e.g., by disassembling binary code of the secondary file) to detect the malware or malicious payload. In some implementations, security platform 215 may analyze signature sequences in the data of the secondary file and compare the signature sequence in the secondary file to signature sequences of malware in a signature database or other malware database. In such implementations, security platform 215 may detect malware in the secondary file when the signature sequences match or satisfy a match threshold (e.g., based on a percentage of values of the signatures that match or do not match).

In some implementations, security platform 215 may perform a statistical-based analysis of the secondary file to determine if the secondary file includes malware. For example, security platform 215 may utilize machine learning that considers characteristics of the received file along with the secondary file being accessed to infer that the received file includes malware. Example characteristics of the received file may include the source of the received file, an intended destination of the received file, a type of the received file, a size of the received file, an application associated with the received file, a time at which the received file was sent or received, a communication protocol through which the received file was received, a network through which the received file was received, or the like.

In some implementations, for a dynamic analysis of the secondary file, security platform 215 may open the secondary file in the secure environment. For example, security platform may open the secondary file by causing an application (e.g., application 217-1) of the secondary file to open the secondary file. Security platform 215 may execute the secondary file by opening the secondary file with an application (e.g., application 217-1) associated with the secondary file. For example, security platform 215 may: open the secondary file with a document application if the secondary file is a document file, open the secondary file with a spreadsheet application if the secondary file is a spreadsheet file, open the secondary file with an image application if the secondary file is an image file, open the secondary file with a PDF application if the secondary file is a PDF file, and so on. Such applications may be implemented by applications 217-1 in computing resource 217.

To dynamically analyze the secondary file, security platform 215 may open the secondary file to trigger a malicious payload in the secondary file that may have been embedded by a malicious object of the received file. Accordingly, security platform 215 may detect the malicious payload in the secondary file by opening the secondary file in the secure environment. In some implementations, security platform 215 may perform a behavior-based analysis to detect malware by detecting changes within the secure environment from opening the secondary file. For example, security platform 215 may identify changes to a directory of the secure environment (e.g., changes to other secondary files), changes to computing resource 217 hosting the secure environment, changes to applications 217-1 executing the secondary file, changes to virtual machines 217-2 executing the secondary file or implementing the secure environment, or the like. In some implementations, security platform 215 may monitor for and/or identify particular application programming interface (API) calls, system calls, instruction traces, registry changes, memory writes, or the like that may indicate that the secondary file includes malware.

In this way, security platform 215 may analyze the secondary file for malware and enable security platform 215 to perform an action on the received file based on the opening of the secondary file. By analyzing the secondary file with a malicious payload in the secure environment, security platform 215 may prevent harm from being caused to cloud computing environment 220 or a target device for which the received file is intended.

As further shown in FIG. 4, process 400 may include performing an action associated with the received file based on the secondary file being analyzed (block 450). For example, security platform 215 may perform the action associated with the received file. In some implementations, security platform 215 may perform the action based on whether malware is identified from the secondary file being analyzed.

In some implementations, when security platform 215 detects malware in the secure environment based on the analysis of the secondary file, security platform 215 may perform one or more actions to prevent the malware from reaching an intended target of the received file. For example, security platform 215 may block, quarantine, and/or scrub the received file to remove the malicious object. In some implementations, security platform 215 may forward the scrubbed received file to an intended recipient of the received file once the scrubbed file is deemed safe. In some implementations, security platform 215 may determine the source of the malware and cause or provide information quarantining the source (or establishing a perimeter around the source) to prevent the source from launching future attacks (e.g., when the source is an internal source of a network monitored by security platform 215). In some implementations, the source may be placed on a "blacklist" that may be used to warn security platform 215 and/or other devices that information received from that source may include malware.

In some implementations, security platform 215 may store information associated with the received file and/or the secondary file to facilitate future detection of malware (e.g., by updating a malware database, such as a database including a list of malware, a signature-based database, a statistical-based database for machine learning, or the like). Accordingly, future harm may be prevented to other computing environments utilizing the information gathered from analyzing the secondary file.

In some implementations, security platform 215 may provide or transmit information associated with the received file and/or the secondary file. For example, security platform 215 may provide information to cause a user interface to present results of an analysis of a received file and/or an affected secondary file to a user. Example results of the analysis may include a malware report or alert (e.g., notifying the user of the presence or non-presence of malware) and/or information associated with detected malware, a type of detected malware, analytics associated with detected malware (e.g., which may be derived from a statistical-based analysis), affected or targeted files, one or sources or origins of detected malware, or the like. In some implementations, security platform 215 may provide information to an intended recipient of the received file. For example, security platform 215 may notify the user that a file intended for the user includes or included malware.

In some implementations, when analysis of the secondary file does not indicate the presence of malware (i.e., the received file is deemed to be safe), security platform 215 may forward the received file to the intended recipient.

In this way, security platform 215 may perform an action associated with the received file. Such actions may prevent harm that may have been caused by malware in the received file and/or prevent harm caused by other malicious files through tracking information associated with received malicious files. Accordingly, some implementations, described herein, enable computing environments to remain operable, prevent failures, shutdowns, or the like that may have been caused by malware.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein may enable detection of malware that infects secondary files with malicious payloads that may be triggered when the secondary files are opened. In some implementations, a security platform may utilize a secure environment, such as a sandbox, to open a received file, determine that a secondary file is accessed based on opening the received file, and analyze the secondary file to detect malicious payloads embedded from a malicious object of the received file. In this way, the security platform may prevent malware from reaching intended targets and harming the intended targets (e.g., by causing shutdowns, causing failures, causing inoperability, extracting information (e.g., personal or financial information), etc.).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors to:
receive a file that is to be analyzed for malware;
open the received file in a secure environment;
install a secondary file in the secure environment to permit a malicious object of the received file to embed a malicious payload of the received file in the secondary file,
the secondary file being a file within a directory of a computing environment that runs an application or program that opens the received file;
determine that the secondary file in the secure environment has been accessed based on the received file being opened by a user;
analyze the secondary file in the secure environment to identify malware; and
perform an action associated with the received file based on the secondary file being analyzed,
where the secure environment is implemented on a computing resource of a cloud environment, and
where the one or more processors, when performing the action associated with the received file, are to:
quarantine a source of the received file based on identifying the malware.

2. The device of claim 1, where the one or more processors, when determining that the secondary file has been accessed, are to:
monitor a directory of the secure environment after opening the received file; and
detect that the secondary file has been modified based on monitoring the directory.

3. The device of claim 1, where the one or more processors, when determining that the secondary file has been accessed, are to:
monitor a designated set of files, in the secure environment, associated with the received file,
the designated set of files comprising the secondary file.

4. The device of claim 1, where the one or more processors, when analyzing the secondary file in the secure environment, are to:
conduct at least one of a static analysis of the secondary file, a signature-based analysis of the secondary file, or a statistical-based analysis of the secondary file to detect the malware.

5. The device of claim 1, where the one or more processors, when analyzing the secondary file in the secure environment, are to:
conduct at least one of a dynamic analysis of the secondary file or a behavior-based analysis of the secondary file to detect the malware.

6. The device of claim 1, where the one or more processors, when analyzing the secondary file in the secure environment, are to:
identify an application associated with the secondary file, and
use the application to open the secondary file in the secure environment.

7. The device of claim 1, where the one or more processors are further to:
prevent the received file from reaching an intended target of the received file based on identifying the malware.

8. The device of claim 1, where the one or more processors are further to:
update a malware database to include information associated with the malware based on identifying the malware.

9. The device of claim 1, where the one or more processors are further to:
place information associated with the source of the received file on a blacklist based on identifying the malware.

10. The device of claim 1, where the one or more processors are further to:
remove, based on identifying the malware, the malicious object from the received file to generate a clean file; and
transmit the clean file to an intended target of the received file.

11. A non-transitory computer-readable medium storing instructions, the instructions comprising:
one or more instructions that, when executed by one or more processors, cause the one or more processors to:
receive a file that is to be analyzed for malware;
open the received file in a first secure environment;
install a secondary file in the first secure environment to permit a malicious object of the received file to embed a malicious payload of the received file in the secondary file,
the secondary file being a file within a directory of a computing environment that runs an application or program that opens the received file;
determine that the secondary file in the first secure environment has been accessed after opening, by a user, the received file;
open the secondary file in a second secure environment to identify malware; and
perform an action associated with the received file based on identifying the malware,
where the first secure environment is implemented on a computing resource of a cloud environment, and
where the one or more instructions, that cause the one or more processors to perform the action associated with the received file, cause the one or more processors to:
quarantine a source of the received file based on identifying the malware.

12. The non-transitory computer-readable medium of claim 11, where the one or more instructions, that cause the one or more processors to open the secondary file in the second secure environment, cause the one or more processors to:
copy the secondary file, and
open the copy of the secondary file in the second secure environment,
where the second secure environment is separate from the first secure environment.

13. The non-transitory computer-readable medium of claim 11, where the one or more instructions further cause the one or more processors to:
prevent the received file from reaching an intended target of the received file based on identifying malware.

14. The non-transitory computer-readable medium of claim 11, where the one or more instructions further cause the one or more processors to:
update a malware database to include information associated with the malware.

15. The non-transitory computer-readable medium of claim 11, where the one or more instructions, further cause the one or more processors to place the source of the received file on a blacklist based on identifying the malware.

16. The non-transitory computer-readable medium of claim 11, where the one or more instructions further cause the one or more processors to:
provide information regarding the malware to a security platform to modify a future operation of the security platform.

17. A method, comprising:
receiving, by one or more devices of a security platform, a file that into be analyzed for malware;
opening, by at least one of the one or more devices, the received file in a secure environment;
installing, by at least one of the one or more devices, a secondary file in the secure environment to permit a malicious object of the received file to embed a malicious payload of the received file in the secondary file,
the secondary file being a file within a directory of a computing environment that runs an application or program that opens the received file;
determining, by at least one of the one or more devices, that the secondary file in the secure environment has been modified based on the received file being opened by a user;
opening, by at least one of the one or more devices, the secondary file in the secure environment;
identifying, by at least one of the one or more devices, malware after opening the secondary file; and
performing, by at least one of the one or more devices, an action associated with the received file based on identifying the malware,
where the secure environment is implemented on a computing resource of a cloud environment, and
where performing the action comprises:
quarantining a source of the received file based on identifying the malware.

18. The method of claim 17, further comprising:
removing the malicious object from the received file based on identifying the malware to generate a clean file; and
transmitting the clean file to an intended target of the received file.

19. The method of claim 17 further comprising:
providing information regarding the malware to the security platform to modify a future operation of the security platform.

20. The method of claim 17, where performing the action comprises:
placing the source of the received file on a blacklist based on identifying the malware.

* * * * *